US011931895B2

(12) United States Patent
Handa et al.

(10) Patent No.: US 11,931,895 B2
(45) Date of Patent: Mar. 19, 2024

(54) ROBOT CONTROL SYSTEM AND ROBOT CONTROL METHOD

(71) Applicant: KABUSHIKI KAISHA YASKAWA DENKI, Kitakyushu (JP)

(72) Inventors: Hiroyuki Handa, Fukuoka (JP); Koji Sokabe, Fukuoka (JP); Keita Shimamoto, Fukuoka (JP); Masaru Adachi, Fukuoka (JP); Ryokichi Hirata, Fukuoka (JP)

( * ) Notice: Subject to any disclaimer, the term of this patent is extended or adjusted under 35 U.S.C. 154(b) by 265 days.

(21) Appl. No.: 17/369,965

(22) Filed: Jul. 8, 2021

(65) Prior Publication Data
US 2021/0339392 A1    Nov. 4, 2021

Related U.S. Application Data

(63) Continuation of application No. PCT/JP2020/001599, filed on Jan. 17, 2020.

(30) Foreign Application Priority Data

Jan. 18, 2019   (JP) ................................. 2019-007251

(51) Int. Cl.
B25J 9/16         (2006.01)
(52) U.S. Cl.
CPC ............. *B25J 9/163* (2013.01); *B25J 9/1689* (2013.01); *B25J 9/161* (2013.01); *B25J 9/1664* (2013.01);
(Continued)

(58) Field of Classification Search
CPC ........ B25J 9/1664; B25J 9/1689; B25J 9/161; B25J 9/163; G05B 2219/39212;
(Continued)

(56) References Cited

U.S. PATENT DOCUMENTS 9,621,856 B2 *  4/2017  Yamamoto ............... B25J 13/08
9,802,317 B1   10/2017  Watts et al.
(Continued)

FOREIGN PATENT DOCUMENTS

CN         104220219         12/2014
CN         204209273          3/2015
(Continued)

OTHER PUBLICATIONS

Extended Search Report in corresponding European Application No. 20741650.4, dated Dec. 16, 2022.
(Continued)

*Primary Examiner* — Abby Y Lin
*Assistant Examiner* — Karston G. Evans
(74) *Attorney, Agent, or Firm* — SOEI PATENT & LAW FIRM

(57) ABSTRACT

A robot control system includes circuitry configured to: determine a necessity of assisting a robot to complete an automated work, based on environment information of the robot; select a remote operator from candidate remote operators based on stored operator data in response to determining that it is necessary to assist the robot to complete the automated work; transmit the environment information to the selected remote operator via a communication network; receive an operation instruction based on the environment (Continued)

information from the selected remote operator via the communication network; and control the robot to complete the automated work based on the operation instruction.

20 Claims, 7 Drawing Sheets

(52) U.S. Cl.
CPC .............. *G05B 2219/39212* (2013.01); *G05B 2219/40153* (2013.01)

(58) Field of Classification Search
CPC ........ G05B 2219/40153; G05B 19/425; G05B 2219/40195; G05D 1/0038
See application file for complete search history.

(56) References Cited

U.S. PATENT DOCUMENTS

| | | | |
|---|---|---|---|
| 2004/0019405 A1* | 1/2004 | Ban | B25J 9/1697 700/213 |
| 2013/0166061 A1* | 6/2013 | Yamamoto | B25J 9/1669 700/214 |
| 2014/0163730 A1 | 6/2014 | Mian | |
| 2015/0019012 A1 | 1/2015 | Yoshida et al. | |
| 2016/0086140 A1 | 3/2016 | Sumioka et al. | |
| 2017/0021502 A1 | 1/2017 | Nusser et al. | |
| 2018/0099407 A1* | 4/2018 | Nakamura | B25J 13/003 |
| 2018/0281180 A1 | 10/2018 | Yamamoto et al. | |
| 2018/0356817 A1* | 12/2018 | Poeppel | H04L 67/306 |
| 2019/0056733 A1* | 2/2019 | Ferguson | G06Q 20/127 |
| 2019/0359424 A1* | 11/2019 | Avraham | G06Q 50/28 |
| 2020/0062267 A1* | 2/2020 | Magzimof | B60W 60/005 |
| 2020/0139539 A1* | 5/2020 | Hasunuma | B25J 9/1664 |
| 2020/0201319 A1* | 6/2020 | Gross | H04W 4/44 |
| 2021/0072734 A1* | 3/2021 | Hirota | G06F 18/285 |
| 2021/0116907 A1* | 4/2021 | Altman | H04W 4/44 |

FOREIGN PATENT DOCUMENTS

| | | |
|---|---|---|
| JP | 2006-082185 | 3/2006 |
| JP | 2014-081813 | 5/2014 |
| JP | 2016-062549 | 4/2016 |
| JP | 2018-171663 | 11/2018 |
| WO | 2013/150599 | 10/2013 |
| WO | 2018/098490 | 5/2018 |
| WO | 2018/183045 | 10/2018 |

OTHER PUBLICATIONS

Office Action issued in Japanese Patent Application No. P2020-566511 dated May 10, 2022 (with English partial translation).
Office Action issued in Indian Patent Application No. 202117034700 dated May 5, 2022.
International Preliminary Report on Patentability with Written Opinion dated Jul. 29, 2021 for PCT/JP2020/001599.
International Search Report dated Mar. 24, 2020 for PCT/JP2020/001599.
Decision to Grant issued in Japanese Patent Application No. P2020-566511, dated Feb. 21, 2023(with English partial translation).
Office Action issued in Chinese Patent Application No. 202080009228.0 dated Nov. 29, 2023 (with English partial translation).

* cited by examiner

ROBOT CONTROL SYSTEM AND ROBOT CONTROL METHOD

CROSS-REFERENCE TO RELATED APPLICATIONS

This application is a continuation application of PCT Application No. PCT/JP2020/001599, filed on Jan. 17, 2020, which claims the benefit of priority from Japanese Patent Application No. 2019-007251, filed on Jan. 18, 2019, the entire contents of which are incorporated herein by reference.

BACKGROUND

1. Field

The present disclosure relates to a robot control system and a robot control method.

2. Description of the Related Art

Japanese Unexamined Patent Application Publication No. 2006-82185 discloses a robot guidance process including a first step of stopping a robot in the middle of a play back operation based on a work program registered in advance, a second step of permitting a direct operation of the robot, a third step of guiding the robot by the direct operation, a fourth step of prohibiting the direct operation of the robot, and a fifth step of continuing the play back operation based on the work program.

SUMMARY

Disclosed herein is an example robot control system. The robot control system may include circuitry configured to: determine a necessity of assisting a robot to complete an automated work, based on environment information of the robot; select a remote operator from candidate remote operators based on stored operator data in response to determining that it is necessary to assist the robot to complete the automated work; transmit the environment information to the selected remote operator via a communication network; receive an operation instruction based on the environment information from the selected remote operator via the communication network; and control the robot to complete the automated work based on the operation instruction.

Additionally, a robot control method is disclosed herein. The robot control method may include: determining a necessity of assisting a robot to complete an automated work, based on an environment information of the robot; selecting a remote operator from candidate remote operators based on stored operator data; transmitting the environment information to the selected remote operator via a communication network; receiving an operation instruction based on the environment information from the selected remote operator via the communication network; and controlling the robot to complete the automated work based on the operation instruction.

DETAILED DESCRIPTION

Figure 1:
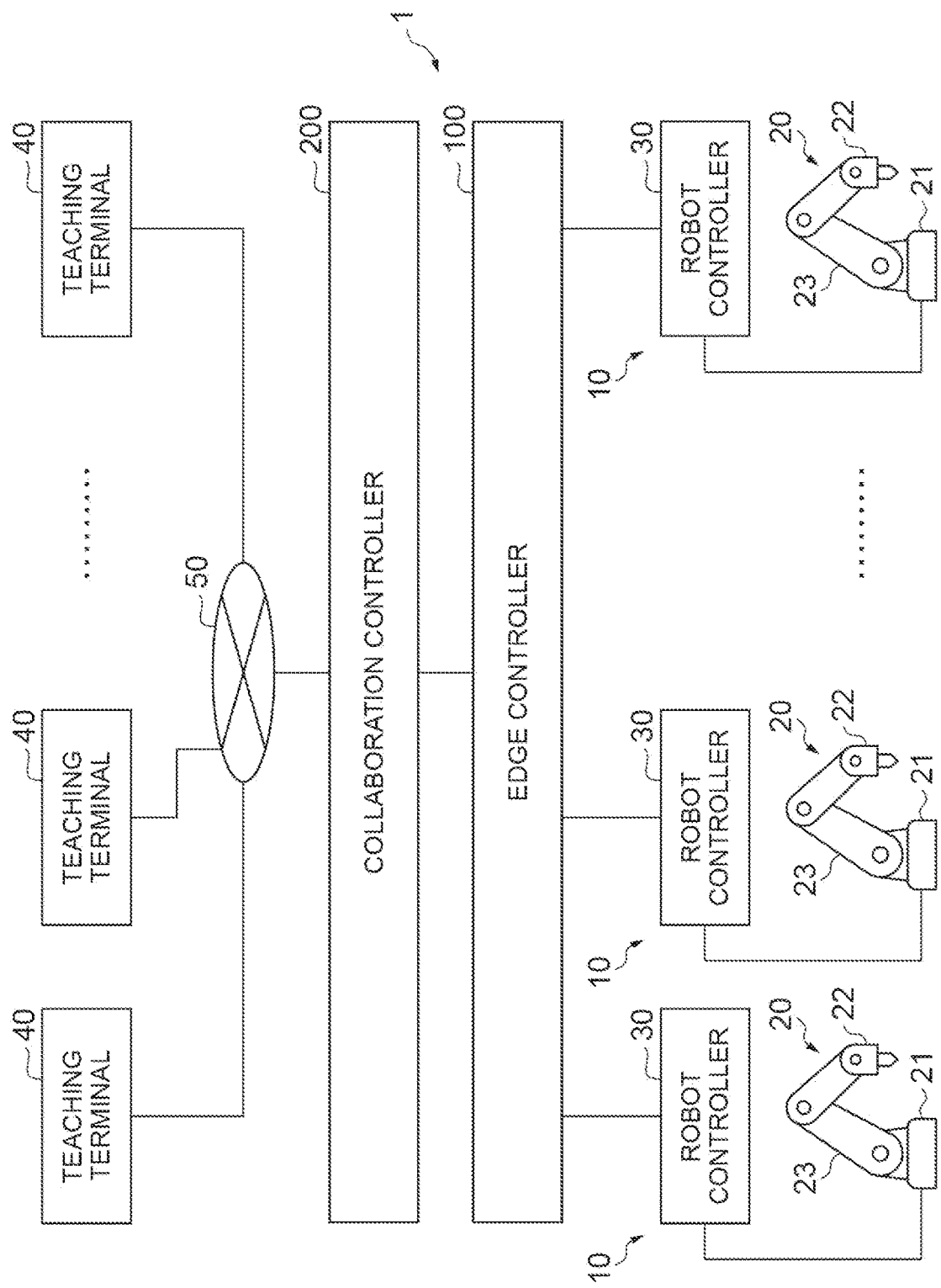
FIG. 1 is a schematic diagram illustrating an overall configuration of a robot control system.

Hereinafter, with reference to the drawings, the same elements or similar elements having the same function are denoted by the same reference numerals, and redundant description will be omitted.

Robot Control System

A robot control system 1 illustrated in FIG. 1 is a control system that enables cooperation between a robot and an operator (or a teacher) via a communication network. The robot control system 1 is configured to: determine a necessity of assisting a robot to complete an automated work, based on environment information of the robot; select a remote operator from candidate remote operators based on stored operator data; transmit the environment information to the selected remote operator via a communication network; receive an operation instruction based on the environment information from the selected remote operator via the communication network; and control the robot to complete the automated work based on the operation instruction. For example, the robot control system 1 is configured to execute: controlling the robot to execute a predetermined work; selecting one of multiple operators when support information is necessary to cause the robot to continue the work; transmitting environment information of the robot to the selected operator via a communication network; receiving support information from the selected operator via the communication network; and controlling the robot to continue the work based on the support information. The work executed by the robot is not particularly limited. Examples of the work executed by the robot include processing, assembly, and transport work. The work executed by the robot is not limited to work in the industrial field. For example, the work to be executed by the robot may be farm work such as sowing, harvesting, leaf scraping, and agrochemical spraying.

For example, the robot control system 1 is interposed between a plurality of robot apparatuses 10 and a plurality of teaching terminals 40. The robot apparatus 10 includes a robot 20 and a robot controller 30. The robot 20 is, for example, a vertical articulated robot, and includes a base 21, a tip portion 22, and an articulated arm 23. The base 21 is installed in the work area. The base 21 may be installed in a vehicle movable in the work area. The tip portion 22 holds a tool for work. Examples of the tool include a gripping hand and various tools. The articulated arm 23 changes the position and orientation of the tip portion 22 relative to the base 21 using a plurality of actuators (e.g., electric actuators) as a power source.

The robot controller 30 controls the robot 20 to operate according to the operation command. The operation command includes, for example, a movement command of the tip portion 22 and an operation command of the tool corresponding to the movement of the tip portion 22. The command to move the tip portion 22 is a command to change the position and orientation of the tip portion 22, and includes a plurality of target positions and orientations (target positions and orientations of the tip portion 22) arranged in time series. The teaching terminal 40 is a terminal used by the operator and may be any terminal as long as reception and display of environment information and input and transmit of support information are possible. Examples of the teaching terminal 40 include a smartphone, a tablet computer, and a personal computer.

For example, the robot control system 1 includes an edge controller 100 and a collaboration controller 200. The edge controller 100 is connected to the robot controller 30 in a wired or wireless manner. The edge controller 100 is configured to: determine the necessity of assisting the robot; and control the robot to complete the automated work based on the operation instruction. For example, the edge controller 100 generates an operation command for causing the robot 20 to execute a predetermined work based on the environment information of the robot 20, and transmits the operation command to the robot controller 30. The edge controller 100 may further be configured to: generate an internal instruction for completing the automated work based on the environment information and a work model, the work model being configured to output internal data indicating the internal instruction in response to input of the environment information; evaluate reliability of the internal instruction based on the internal data; and determine the necessity of assisting the robot 20 based on the reliability of the internal instruction. For example, the edge controller 100 is configured to: store a work model configured to output work instruction information of the robot 20 corresponding to environment information of the robot in response to input of the environment information of the robot 20; derive work instruction information for the robot 20 based on the environment information of the robot 20 and the work model; determine work availability of the work of the robot 20 based on the work instruction information based on environment information of the robot 20 and the work model; and request the support information in response to determining that the work of the robot 20 based on the work instruction information is unavailable.

The edge controller 100 may further be configured to: control the robot to complete the automated work based on the internal instruction in response to determining that the reliability of the internal instruction is higher than a reliability threshold; and determine that it is necessary to assist the robot if the reliability of the internal instruction is lower than the reliability threshold. For example, when it is determined that the work of the robot 20 based on the work instruction information is available, the edge controller 100 generates an operation command based on the work instruction information and outputs the operation command to the robot controller 30. When it is determined that the work of the robot 20 based on the work instruction information is not available, the edge controller 100 generates an operation command based on the support information and outputs the operation command to the robot controller 30.

The collaboration controller 200 is connected to a plurality of teaching terminals 40 via a communication network 50. The collaboration controller 200 may be connected to the edge controller 100 via a wired or wireless dedicated line or may be connected to the edge controller 100 via the communication network 50. The communication network 50 may be a local area network or a wide area network (for example, the Internet).

The collaboration controller 200 is configured to: select a remote operator from candidate remote operators based on stored operator data; transmit the environment information to the selected remote operator via a communication network; receive an operation instruction based on the environment information from the selected remote operator via the communication network. For example, the collaboration controller 200 is configured to: store information of multiple operators; select one of the multiple operators in response to receiving a request of support information from the edge controller 100; transmit environment information of the robot 20 to a teaching terminal 40 of the selected operator via the communication network 50; receive the support information based on the environment information from the teaching terminal 40 of the selected operator via the communication network 50; and transmit the support information to the edge controller 100. Hereinafter, configurations of the edge controller 100 and the collaboration controller 200 will be described.

Edge Controller

Figure 2:
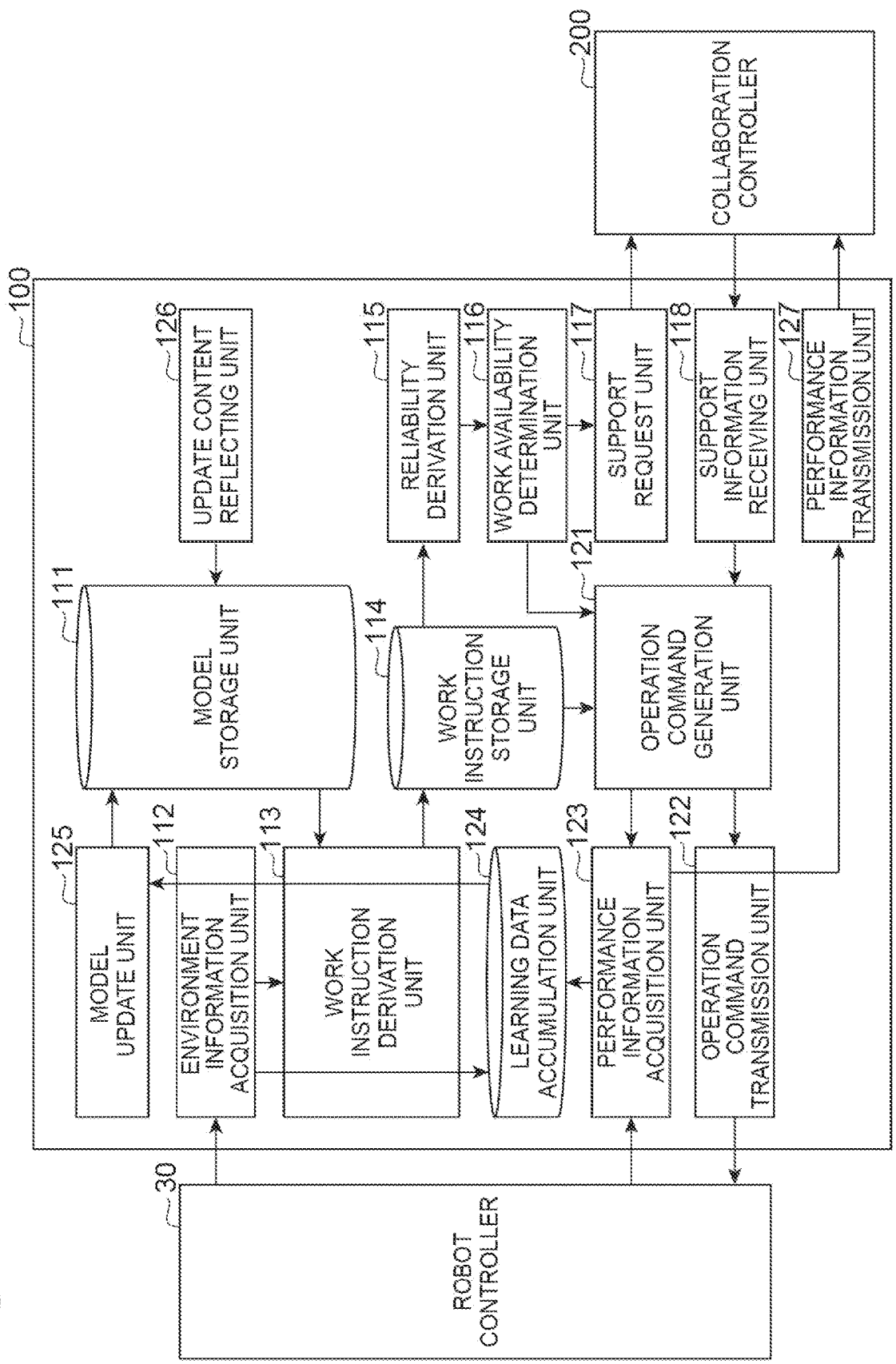
FIG. 2 is a block diagram illustrating a functional configuration of an edge controller.

As shown in FIG. 2, the edge controller 100 includes a model storage unit 111, an environment information acquisition unit 112, a work instruction derivation unit 113, a work instruction storage unit 114, a reliability derivation unit 115, a work availability determination unit 116, a support request unit 117, a support information receiving unit 118, an operation command generation unit 121, and an operation command transmission unit 122 as a functional configuration (hereinafter referred to as "functional module").

The model storage unit 111 stores a plurality of work models respectively corresponding to the plurality of robots 20. Each of the work models is configured to output internal data indicating the internal instruction in response to input of the environment information. For example, each of the work models outputs the internal data indicating the internal instruction (the work instruction information of the robot 20 corresponding to the environment information) in response to the input of the environment information of the robot 20. The environment information indicates the state of the surrounding environment of the robot 20. Examples of the environment information include two-dimensional or three-dimensional image information. The work instruction information includes information necessary for specifying work contents such as a work object in the surrounding environment of the robot 20. The internal instruction may include a designation of a work object of the automated work. The internal data may include a recommendation degree as the work object for one or more objects. When there are a plurality of objects that can be a work target in the surrounding environment of the robot 20, internal data may include a plurality of numerical values indicating recommendation degrees of the plurality of objects as work objects. The work object is indicated by the values of recommendation degrees. The work instruction information may be the operation command.

The work model is constructed by machine learning. An example of the work model is a neural network in which the environment information is an input vector and the work instruction information is an output vector. The neural network includes an input layer, one or more intermediate layers, and an output layer. The input layer directly outputs the input vector to the next intermediate layer. The intermediate layer converts the input from the previous layer by the activation function and outputs the converted input to the next layer. The output layer converts an input from an intermediate layer farthest from the input layer by an activation function, and outputs the conversion result as an output vector. The work model may be anything as long as it outputs work instruction information according to at least the input of environment information, and is not necessarily limited to a neural network. For example, the work model may be a function derived based on statistical analysis or the like.

The work model may be configured to output work instruction information including the operation command. In this case, the work model may include an algorithm for generating the movement command of the tip portion 22 in which the collision between the robot 20 and the peripheral object does not occur by the random trial of the simulation.

The environment information acquisition unit 112 acquires the environment information of the robot 20 from the robot controller 30. The work instruction derivation unit 113 derives work instruction information for the robot 20 based on the environment information of the robot 20 acquired by the environment information acquisition unit 112 and the work model stored in the model storage unit 111. For example, the work instruction derivation unit 113 inputs the environment information of the robot 20 to the work model, and obtains the work instruction information output by the work model according to the environment information. The work instruction storage unit 114 stores the work instruction information derived by the work instruction derivation unit 113.

The reliability derivation unit 115 derives the reliability of the work instruction information. The reliability derivation unit 115 may be configured to evaluate reliability of the internal instruction based on the internal data. The reliability derivation unit 115 may further be configured to evaluate the reliability based on the recommendation degree. For example, the internal data includes a first recommendation degree as the work object for a first object and a second recommendation degree as the work object for a second object, and the reliability derivation unit 115 may further be configured to evaluate the reliability based on a difference between the first recommendation degree and the second recommendation degree. For example, the reliability derivation unit 115 derives the reliability based on a difference in recommendation degree between an object having the highest recommendation degree as the work object (hereinafter referred to as a "favorite object") and another object. Specifically, the reliability derivation unit 115 increases the reliability as the difference in recommendation degree between the favorite object and the other object increases (i.e., as the recommendation degree of the favorite object becomes relatively high).

When the work instruction information is the operation command, the reliability derivation unit 115 may derive the reliability based on the operation of the robot 20 according to the operation command. For example, the reliability derivation unit 115 may derive the reliability based on the simulation of the operation of the robot 20 according to the operation command. For example, the reliability derivation unit 115 may reduce the reliability as the distance between the robot 20 and the peripheral object decreases at the time when the robot 20 in operation and the peripheral object come closest to each other.

The work availability determination unit 116 is configured to determine that it is necessary to assist the robot if the reliability of the internal instruction is lower than the reliability threshold. For example, the work availability determination unit 116 determines the work availability of the robot 20 based on the work instruction information based on the environment information of the robot 20 acquired by the environment information acquisition unit 112 and the work model stored in the model storage unit 111. For example, the work availability determination unit 116 determines that the work of the robot 20 based on the work instruction information is available (or permits the work) when the reliability derived by the reliability derivation unit 115 exceeds a predetermined threshold value, and determines that the work of the robot 20 is unavailable (or prohibits the work) based on the work instruction information when the reliability falls below the threshold value.

The support request unit 117 is configured to determine a necessity of assisting a robot to complete an automated work, based on environment information of the robot 20. For example, the support request unit 117 requests the collaboration controller 200 to transmit support information when the work availability determination unit 116 determines that the work of the robot 20 is unavailable based on the work instruction information. The support request unit 117 transmits the environment information of the robot 20 to the collaboration controller 200 in response to the request to transmit the support information. The support request unit 117 may further transmit difficulty level of providing the support information to the collaboration controller 200 when requesting to transmit the support information. In this case, the support request unit 117 may calculate the difficulty level based on the reliability. For example, the support request unit 117 may increase the difficulty level as the reliability decreases.

The support information receiving unit 118 receives the support information transmitted by the collaboration controller 200 in response to the request from the support request unit 117. For example, like work instruction information, support information includes information necessary for specifying work content. The support information may include the operation command.

The operation command generation unit 121 is configured to control the robot to complete the automated work based on the operation instruction. For example, the operation command generation unit 121 generates the operation command based on the work instruction information or the support information. For example, the operation command generation unit 121 generates the movement command of the tip portion 22 and the operation command of the tool corresponding to the movement of the tip portion 22 so as to execute the work content specified by the work instruction information or the support information. When the work instruction information and the support information include the operation command, the operation command generation unit 121 selects the operation command based on the work instruction information or the operation command based on the support information based on the determination result by the work availability determination unit 116. The operation command transmission unit 122 transmits the operation command generated by the operation command generation unit 121 to the robot controller 30.

The edge controller 100 may be configured to: accumulate environment information of the robot 20 and a work result of the robot 20 as learning data; and update the work model in the model storage unit 111 by machine learning based on the accumulated learning data. Further, the edge controller 100 may be configured to reflect the update content of the work model in the work model of another robot 20 when the work model of any robot 20 is updated. For example, the edge controller 100 further includes, as functional modules, a performance information acquisition unit 123, a learning data accumulation unit 124, a model update unit 125, an update content reflecting unit 126, and a performance information transmission unit 127.

The performance information acquisition unit 123 acquires work performance information on the work result of the robot 20. For example, the work result information includes work instruction information or support information and success/failure information indicating success/failure of work by the robot 20 operated according to the work instruction information or the support information. Examples of the success/failure information include information indicating the presence or absence of an alarm in the robot controller 30.

The work result information may further include efficiency information indicating efficiency of work by the robot 20 operated according to the work instruction information or the support information. Examples of the efficiency information include the work time of the robot 20 measured by the robot controller 30. For example, the performance information acquisition unit 123 acquires work instruction information or support information from the operation command generation unit 121, and acquires success/failure information and efficiency information from the robot controller 30.

The learning data accumulation unit 124 accumulates the environment information of the robot 20 and the work result information of the robot 20 corresponding to the environment information as learning data. For example, the learning data accumulation unit 124 acquires the environment information of the robot 20 from the environment information acquisition unit 112, and acquires and accumulates the work result information of the robot 20 corresponding to the environment information from the performance information acquisition unit 123. The learning data accumulation unit 124 may accumulate learning data for each robot 20. In some examples, the learning data accumulation unit 124 may accumulate a plurality of learning data sets (sets of learning data) respectively corresponding to the plurality of robots 20.

The model update unit 125 updates the work model of the model storage unit 111 by machine learning (for example, deep learning) based on the learning data accumulated by the learning data accumulation unit 124. For example, the model update unit 125 updates a parameter of the work model (for example, weight of the activation function) based on the learning data so as to increase the suitability of the work instruction information output by the work model in accordance with the input of the environment information. In some examples, the model update unit 125 repeatedly applies the environment information of the robot 20 and the work record of the robot 20 corresponding to the environment information to the work model to update the parameters of the work model.

When the model update unit 125 updates the work model of any robot 20, the update content reflecting unit 126 reflects the update content of the work model in the work model of any other robot 20. For example, when the model update unit 125 updates the work model of any robot 20, the update content reflecting unit 126 overwrites the work model of another robot 20 that performs the same type of work as the robot 20 with the updated work model. The performance information transmission unit 127 transmits the work result information acquired by the performance information acquisition unit 123 to the collaboration controller 200. The work result information transmitted by the performance information transmission unit 127 is used to evaluate the operator as described later.

Collaboration Controller

Figure 3:
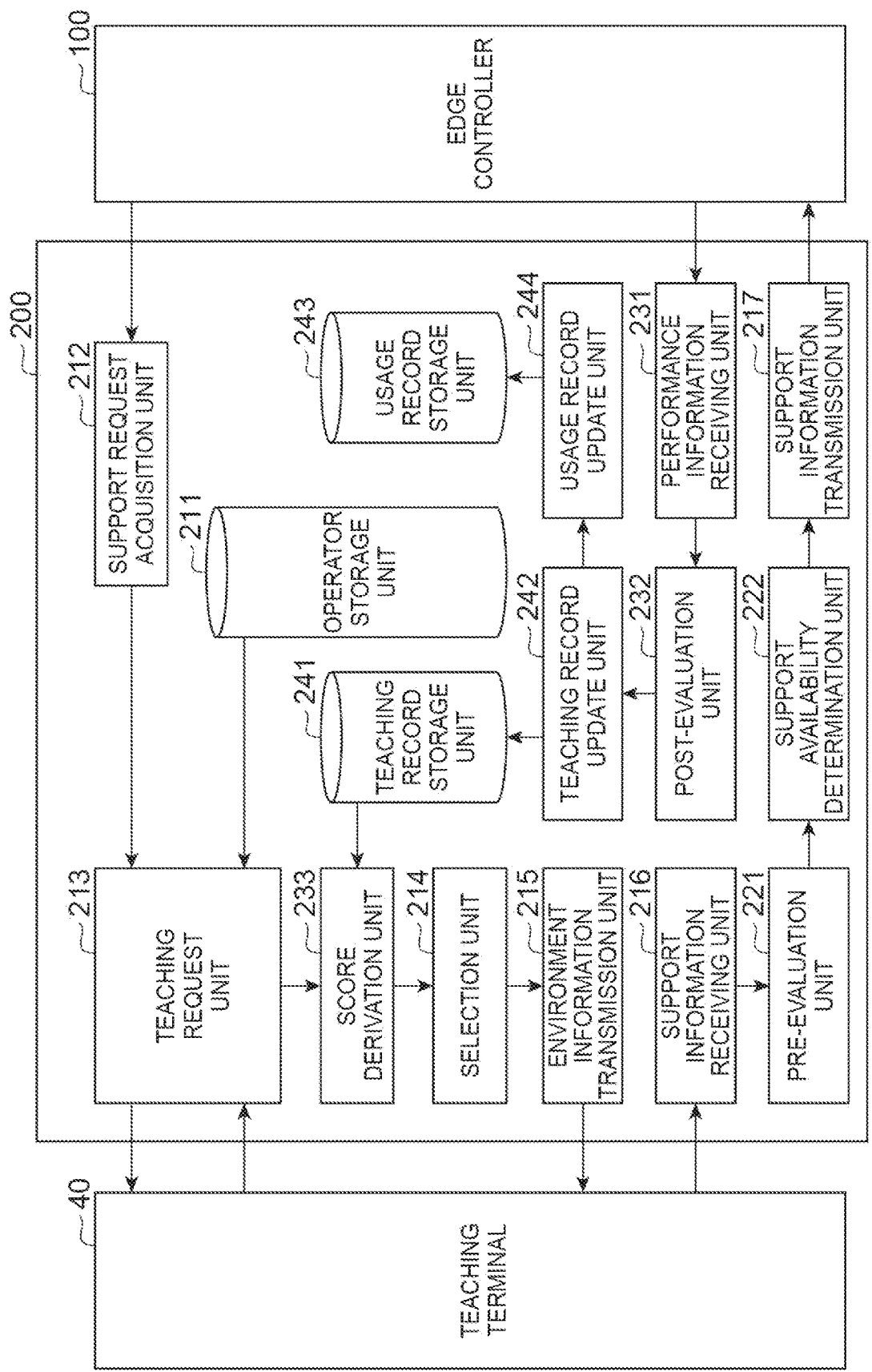
FIG. 3 is a block diagram illustrating a functional configuration of a collaboration controller.

As shown in FIG. 3, the collaboration controller 200 includes, as functional modules, an operator storage unit 211, a support request acquisition unit 212, a teaching request unit 213, a selection unit 214, an environment information transmission unit 215, a support information receiving unit 216, and a support information transmission unit 217.

The operator storage unit 211 stores information of multiple operators. The operator information includes, for example, operator identification information and operator access information. The access information is information indicating an information transmit destination to the operator, such as an electronic mail address. The operator data may include a teaching type of each of the candidate remote operators. For example, the information of the operator may include information of a work type that can be taught by the operator. The work type that can be taught by the operator means a work type that enables the operator to determine in which procedure the robot 20 should perform work. The work type that can be taught by the operator is determined according to expert knowledge or skill of the operator. For example, according to an operator who has expertise or skill in cutting but no expertise or skill in welding, while the teaching of cutting is possible, the teaching of welding is impossible.

The support request acquisition unit 212 acquires the transmit request of the support information from the edge controller 100 (support request unit 117). As described above, the transmit request of the support information includes the environment information of the robot 20. The transmit request of the support information may further include a difficulty level of providing the support information. When the support information is necessary, the teaching request unit 213 requests the multiple operators stored in the operator storage unit 211 to transmit the support information via the communication network 50. The case where the support information is necessary means a case where the robot 20 cannot continue the work without the support information. Examples of the case where the support information is necessary include a case where the edge controller 100 deter nines that work of the robot 20 based on the work instruction information is unavailable. For example, when the support request acquisition unit 212 acquires the transmit request of the support information, the teaching request unit 213 delivers a message requesting the transmission of the support information to the teaching terminal 40 of the multiple operators.

The selection unit 214 is configured to select a remote operator from candidate remote operators based on stored operator data. For example, the selection unit 214 selects one of the multiple operators stored in the model storage unit 111 as the transmitter of the support information. The selection unit 214 may further be configured to select the remote operator based on a comparison between a work type of the automated work and a teaching type of each of the candidate remote operators. For example, the selection unit 214 may select one of the multiple operators based on the information of the work type that can be taught by each of the multiple operators and the work type of the robot 20. For example, the selection unit 214 may select an operator capable of teaching the work type of the robot 20 from the multiple operators. The selection unit 214 may select any of the multiple operators based on the response speed to the request from the tearing request unit 213. For example, the selection unit 214 may preferentially select an operator whose response to a request from the teaching request unit 213 is fast. In addition, the selection unit 214 may select any of multiple operators by a combination of a plurality of select criteria (for example, a select criterion based on the work type and a select criterion based on the response speed).

The environment information transmission unit 215 is configured to transmit the environment information to the selected remote operator via a communication network. For example, the environment information transmission unit 215 transmits the environment information of the robot 20 to the operator selected by the selection unit 214 (hereinafter referred to as "selected operator") via the communication network 50. For example, the environment information transmission unit 215 transmits the environment information received from the edge controller 100 (the support request unit 117) to the terminal 40 of the selected operator. The teaching terminal 40 of the selected operator displays environment information of the robot 20, and transmits support information input by the selected operator based on the environment information to the collaboration controller 200.

The support information receiving unit 216 is configured to receive an operation instruction based on the environment information from the selected remote operator via the communication network 50. The support information receiving unit 216 receives support information from the selected operator via the communication network 50. For example, the support information receiving unit 216 receives the support information transmitted by the terminal 40 of the selected operator. The support information transmission unit 217 transmits the support information received by the support information receiving unit 216 to the edge controller 100. The support information transmitted by the support information transmission unit 217 is received by the above-described support information receiving unit 118.

The collaboration controller 200 may be configured to: evaluate a pre-suitability of the operation instruction before controlling the robot based on the operation instruction; and reject the operation instruction if the pre-suitability is lower than a suitability threshold. For example, the collaboration controller 200 may be configured to: derive a suitability of the support information based on existing data before a work of the robot 20 based on the support information; and determine an adoptability of the support information based on the suitability. For example, the collaboration controller 200 further includes a pre-evaluation unit 221 and a support availability determination unit 222 as functional modules.

The pre-evaluation unit 221 is configured to evaluate the pre-suitability of the operation instruction before controlling the robot based on the operation instruction. For example, the pre-evaluation unit 221 evaluates the suitability of the support information (hereinafter referred to as "pre-suitability") based on the existing data before the work of the robot 20 based on the support information. Examples of the existing information include the support information itself, which is a target for deriving the pre-suitability, and a transmission result (for example, post-suitability described later) of the support information in the past by the selected operator receiver. The pre-evaluation unit 221 may further be configured to evaluate the pre-suitability based on a suitability of the work object for a type of the automated work. For example, the pre-evaluation unit 221 derives the pre-suitability based on whether or not the work object indicated by the support information is an appropriate object as a work target. For example, when an object that is fixed to a space and is obviously unconveyable is set to be a work object to be conveyed, the pre-evaluation unit 221 lowers the pre-suitability.

The support availability determination unit 222 determines the adoptability of the support information based on the pre-suitability of the support information derived by the pre-evaluation unit 221. The support availability determination unit 222 is configured to reject the operation instruction if the pre-suitability is lower than a suitability threshold. For example, the support availability determination unit 222 determines that the support information can be adopted when the pre-suitability of the support information exceeds a predetermined adoption threshold, and determines that the support information cannot be adopted when the pre-suitability of the support information is below the adoption threshold. When the support availability determination unit 222 determines that support information cannot be adopted, the support information transmission unit 217 is prohibited from transmitting the support information.

The collaboration controller 200 may further be configured to: elect the remote operator from the candidate remote operators based at least in part on the score for each of the candidate remote operators; evaluate a post-suitability of the operation instruction based on a work result of the automated work based on the operation instruction; and update the score of the selected remote operator based on the post-suitability for future selection. For example, the collaboration controller 200 may be configured to: derive a suitability of the support information based on a work result of the robot 20 after the work of the robot 20 based on the support information; derive a score of the operator who provides the support information based on the suitability, and select one of the multiple operators based on the score. For example, the collaboration controller 200 further includes a performance information receiving unit 231, a post-evaluation unit 232, and a score derivation unit 233 as functional modules.

The performance information receiving unit 231 receives work result information indicating the work result of the robot 20 based on the support information from the performance information transmission unit 127. The post-evaluation unit 232 is configured to evaluate the post-suitability of the operation instruction based on the work result of the automated work based on the operation instruction. For example, the post-evaluation unit 232 evaluates the suitability of the support information (hereinafter referred to as "post-suitability") based on the work result information received by the performance information receiving unit 231. For example, when the success/failure information indicates success of the work by the robot 20, the post-evaluation unit 232 increases the post-suitability compared to when the success/failure information indicates failure of the work by the robot 20. The post-evaluation unit 232 increases the post-suitability as the work efficiency indicated by the efficiency information increases.

The score derivation unit 233 is configured to update the score of the selected remote operator based on the post-suitability for future selection. For example, the score derivation unit 233 derives the operator's score of the support information based on the post-suitability derived by the post-evaluation unit 232. For example, the score derivation unit 233 increases the score of the operator as the post-suitability increases.

The selection unit 214 may further be configured to select the remote operator from the candidate remote operators based at least in part on the score for each of the candidate remote operators. For example, the selection unit 214 may select one of the multiple operators based on the score derived by the score derivation unit 233. For example, the selection unit 214 may preferentially select an operator having a high score derived by the score derivation unit 233. In this case, the selection unit 214 may select one of the multiple operators based on a combination of the select criterion based on the score height and another select criterion (for example, the select criterion based on the work type and the select criterion based on the response speed).

The collaboration controller 200 may be further configured to: store a teaching record value and an operator in association with each other, the teaching record value being a calculation reference of a reward amount for the support information; and update the teaching record value of the operator of the support information according to the work every time the work of the robot 20 based on the support information is executed. The collaboration controller 200 may be further configured to: store a usage record value and the robot 20 in association with each other, the usage record value serving as a calculation reference of a billing amount corresponding to utilization of the support information; and update the usage record value of the robot 20 according to the work every time the work of the robot 20 based on the support information is executed. For example, the collaboration controller 200 further includes, as functional modules, a teaching record storage unit 241, a teaching record update unit 242, a usage record storage unit 243, and a usage record update unit 244.

The teaching record storage unit 241 stores the teaching record value and the operator in association with each other. For example, the teaching record value is a value indicating the transmit record of the support information used to cause the robot 20 to continue work. The teaching record value may include the evaluation result of the post-suitability by the post-evaluation unit 232 or may include the accumulated value of the post-suitability. In this case, for example, the score derivation unit 233 may refer to the teaching record storage unit 241 and derive the score of the operator based on the teaching record value. The score derivation unit 233 may use the teaching record value itself as the score of the operator or may calculate the score of the operator by performing a predetermined operation on the teaching record value.

Each time work of the robot 20 based on support information is executed, the teaching record update unit 242 updates the teaching record value of the operator of the support information according to the work. For example, each time the post-evaluation unit 232 derives the post-suitability of the support information, the teaching record update unit 242 adds a value correlated with the post-suitability (hereinafter, referred to as an "addition value") to the teaching record value of the operator of the support information. For this reason, every time the work of the robot 20 based on the support information is executed, the teaching record value of the operator of the support information increases, and the higher the post-suitability is, the larger the increment is. The teaching record update unit 242 may change the added value to the teaching record value of the operator of the support information based on the difficulty level of providing the support information. For example, the teaching record update unit 242 may increase the additional value as the difficulty level of providing support information increases.

The usage record storage unit 243 stores the usage record value and the robot 20 in association with each other. The usage record value may include the evaluation result of the suitability by the post-evaluation unit 232. Every time work of the robot 20 based on support information is executed, the usage record update unit 244 updates the usage record value of the robot 20 according to the work. For example, every time the post-evaluation unit 232 derives the post-suitability of the support information, the usage record update unit 244 adds a value correlated with the post-suitability (hereinafter referred to as an "addition value") to the usage record value of the robot 20 that has utilized the support information. Therefore, every time work of the robot 20 based on support information is executed, the usage record value of the robot 20 is increased, and the amount of increase becomes larger as the post-suitability becomes higher. The usage record update unit 244 may change the value added to the usage record value of the robot 20 that has utilized the support information, based on the difficulty level of providing the support information. For example, the usage record update unit 244 may increase the additional value as the difficulty level of providing support information increases.

Hardware Configuration of Edge Controller and Collaboration Controller

Figure 4:
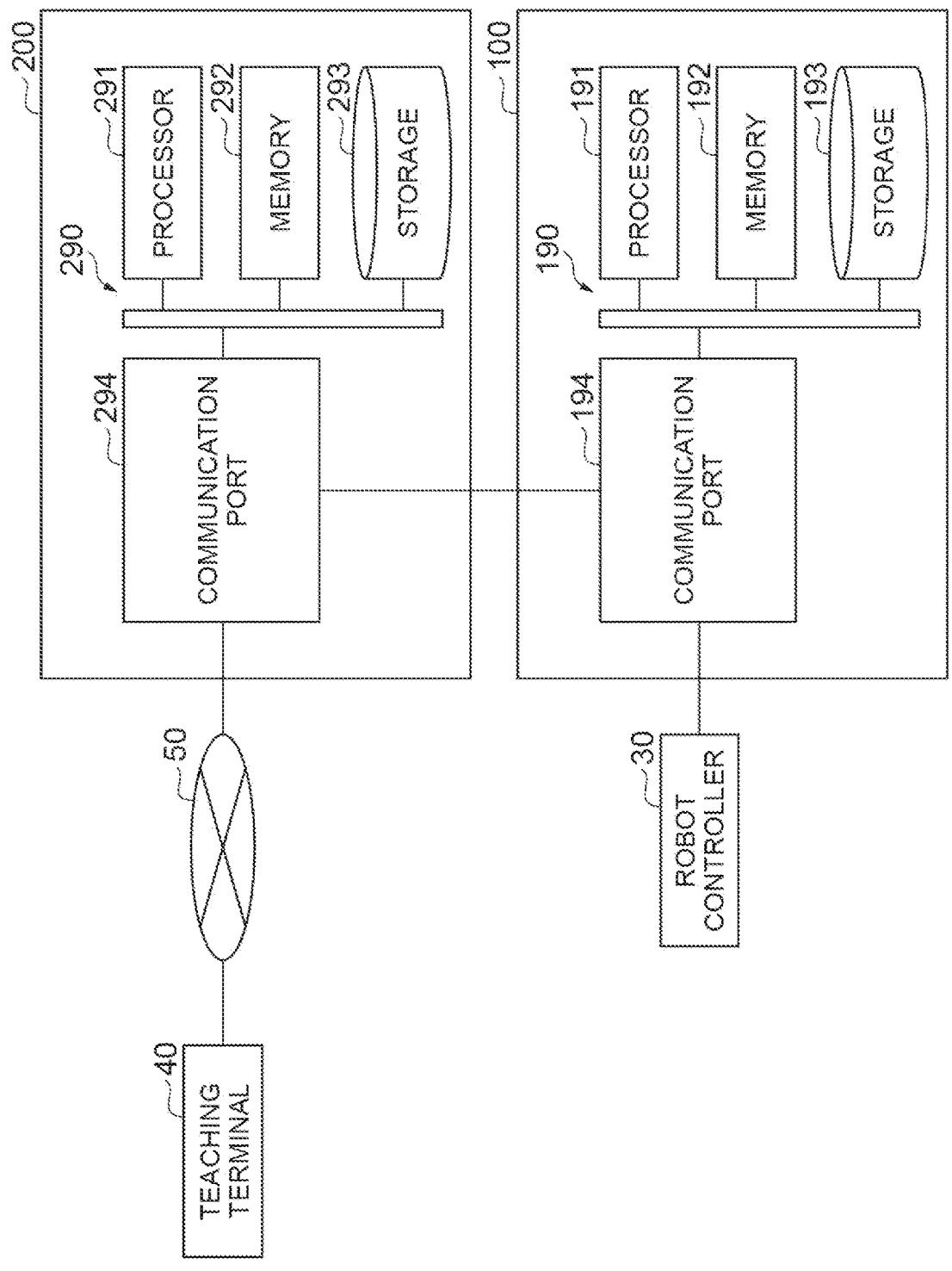
FIG. 4 is a block diagram illustrating a hardware configuration of the edge controller and the collaboration controller.

FIG. 4 is a block diagram illustrating a hardware configuration of the edge controller 100 and the collaboration controller 200. The edge controller 100 includes circuitry 190. The circuitry 190 includes at least one processor 191, a memory 192, a storage 193, and a communication port 194. The storage 193 is a storage medium such as at least one hard disk or a nonvolatile memory. For example, the storage 193 stores a program for causing the edge controller 100 to: store a work model for outputting work instruction information of the robot 20 corresponding to environment information of the robot 20 in response to input of the environment information; derive work instruction information to the robot 20 based on the environment information and the work model of the robot 20; determine availability of the work of the robot 20 based on the work instruction information based on the environment information and the work model of the robot 20, and request support information when it is determined that the work of the robot 20 based on the work instruction information is unavailable. For example, the storage 193 stores a program for configuring the functional modules of the edge controller 100 described above. The memory 192 temporarily stores a program loaded from the storage 193, an operation result by the processor 191, and the like. The processor 191 executes the program in cooperation with the memory 192 to configure each functional module of the edge controller 100. The communication port 194 performs network communication with the robot controller 30 and the collaboration controller 200 in response to a command from the processor 191.

The collaboration controller 200 includes circuitry 290. The circuitry 290 includes at least one processor 291, a memory 292, a storage 293, and a communication port 294. The storage 293 is a storage medium such as at least one hard disk or a nonvolatile memory. The storage 293 stores a program that causes the collaboration controller 200 to execute storing information of multiple operators, selecting any of the multiple operators in response to a request for support information from the edge controller 100, transmitting environment information of the robot 20 to the teaching terminal 40 of the selected operator via the communication network 50, receiving support information based on the environment information from the teaching terminal 40 of the selected operator via the communication network 50, and transmitting the received support information to the edge controller 100. For example, the storage 293 stores a program for configuring the functional modules of the collaboration controller 200 described above. The memory 292 temporarily stores a program loaded from the storage 293, an operation result by the processor 291, and the like. The processor 291 executes the program in cooperation with the memory 292 to configure each functional module of the collaboration controller 200. The communication port 294 performs network communication between the teaching terminal 40 and the edge controller 100 in response to a command from the processor 291. The storage 293 is not necessarily built in the collaboration controller 200. For example, the storage 293 may be an external storage (for example, a cloud) connected to the communication port 294 via the communication network 50.

Robot Control Procedure

Next, as an example of the robot control method, a control procedure executed by the robot control system 1 will be described. This control procedure includes an output procedure of an operation command executed by the edge controller 100, an update procedure of a work model executed by the edge controller 100, and a receive procedure of support information executed by the collaboration controller 200. Hereinafter, each procedure will be described in detail.

Operation Command Output Procedure

The operation command output procedure includes: deriving work instruction information to the robot 20 based on the environment information of the robot 20 and the work model; determining availability of work of the robot 20 based on the work instruction information based on the environment information of the robot 20 and the work model; generating an operation command based on the work instruction information and outputting the operation command to the robot controller 30; and, when it is determined that work of the robot 20 based on the work instruction information is unavailable, requesting the support information and generating an operation command based on the support information and output the operation command to the robot controller 30.

Figure 5:
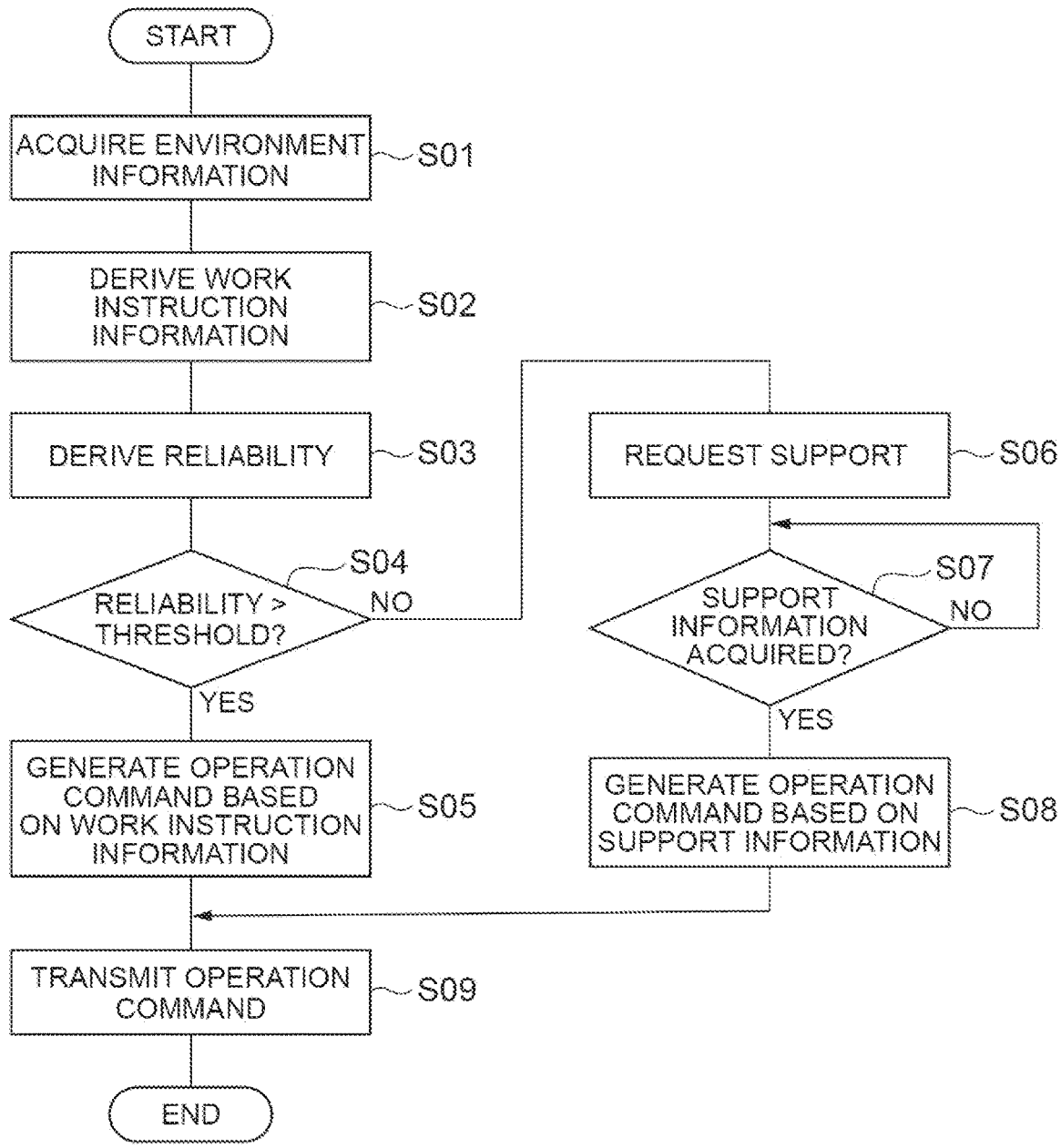
FIG. 5 is a flowchart illustrating an output procedure of an operation command.

FIG. 5 is a flowchart illustrating an output procedure of an operation command executed by the edge controller 100 for one robot 20. As shown in FIG. 5, the edge controller 100 first executes operations S01 and S02. In operation S01, the environment information acquisition unit 112 acquires the environment information of the robot 20 from the robot controller 30. In operation S02, the work instruction derivation unit 113 derives work instruction information for the robot 20 based on the environment information of the robot 20 acquired by the environment information acquisition unit 112 and the work model stored in the model storage unit 111. For example, the work instruction derivation unit 113 inputs the environment information of the robot 20 to the work model, obtains the work instruction information output by the work model according to the environment information, and writes the work instruction information to the work instruction storage unit 114.

Next, the edge controller 100 executes operations S03 and S04. In operation S03, the reliability derivation unit 115 derives the reliability of the work instruction information. In operation S04, the work availability determination unit 116 determines the work availability of the robot 20 based on the work instruction information based on the environment information of the robot 20 acquired by the environment information acquisition unit 112 and the work model stored in the model storage unit 111. For example, the work availability determination unit 116 determines that the work of the robot 20 based on the work instruction information is available when the reliability derived by the reliability derivation unit 115 exceeds a predetermined threshold, and determines that the work of the robot 20 based on the work instruction information is unavailable when the reliability falls below the threshold.

If it is determined in operation S04 that the work of the robot is available based on the work instruction information, the edge controller 100 executes operation S05. In operation S05, the operation command generation unit 121 generates an operation command of the robot 20 based on the work instruction information. For example, the operation command generation unit 121 generates the movement command of the tip portion 22 and the operation command of the tool corresponding to the movement of the tip portion 22 so as to execute the work content specified by the work instruction information.

If it is determined in operation S04 that the work of the robot based on the work instruction information is unavailable, the edge controller 100 executes operations S06, S07, and S08. In operation S06, the support request unit 117 requests the collaboration controller 200 to transmit support information. In addition, the support request unit 117 transmits environment information of the robot 20 to be referred to by the operator to the collaboration controller 200. In operation S07, the support information receiving unit 118 receives the support information transmitted by the collaboration controller 200 in response to the request from the support request unit 117. In operation S08, the operation command generation unit 121 generates an operation command of the robot 20 based on the support information. For example, the operation command generation unit 121 generates the movement command of the tip portion 22 and the operation command of the tool corresponding to the movement of the tip portion 22 so as to execute the work content specified by the support information.

After operations S05 or S08, the edge controller 100 executes operation S09. In operation S09, the operation command transmission unit 122 outputs the operation command generated by the operation command generation unit 121 to the robot controller 30. The robot controller 30 controls the robot 20 according to the operation command output from the operation command transmission unit 122. As a result, work based on work instruction information or support information is executed by the robot 20. This completes the output procedure of the operation command. The edge controller 100 repeats the above procedure for each of the plurality of robots 20.

Update Procedure of Work Model

The update procedure of the work model includes: accumulating the environment information of the robot 20 and the work result of the robot 20 as learning data; updating the work model of the model storage unit 111 by machine learning based on the accumulated learning data; and reflecting the update content of the work model of the robot 20 in the work models of the other robots 20.

Figure 6:
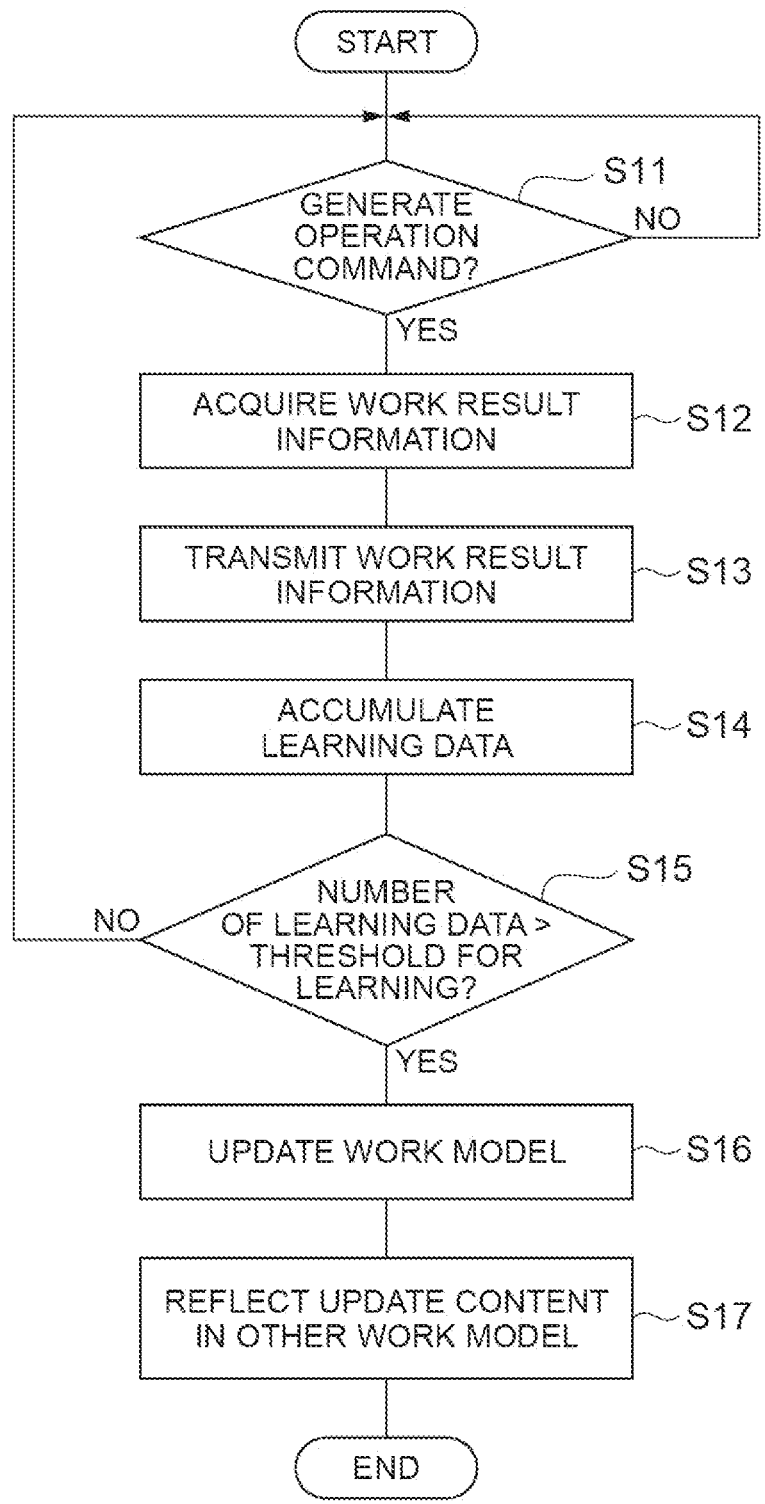
FIG. 6 is a flowchart illustrating an update procedure of a work model.

FIG. 6 is a flowchart illustrating an update procedure executed by the edge controller 100 for the work model of one robot 20. As shown in FIG. 6, the edge controller 100 first executes operations S11, S12, and S13. In operation S11, the performance information acquisition unit 123 waits for the operation command generation unit 121 to generate the operation command. In operation S12, the performance information acquisition unit 123 acquires work result information on the work result of the robot 20 according to the operation command. For example, the performance information acquisition unit 123 acquires work instruction information or support information from the operation command generation unit 121, and acquires success/failure information, efficiency information, and the like from the robot controller 30. In operation S13, the performance information transmission unit 127 transmits the work result information acquired by the performance information acquisition unit 123 to the collaboration controller 200.

Next, the edge controller 100 executes operations S14 and S15. In operation S14, the learning data accumulation unit 124 accumulates the environment information of the robot 20, the work result information of the robot 20 corresponding to the environment information, and the learning data. For example, the learning data accumulation unit 124 acquires the environment information of the robot 20 from the environment information acquisition unit 112, acquires the work result information of the robot 20 corresponding to the environment information from the performance information acquisition unit 123, and accumulates them as the learning data. In operation S15, the model update unit 125 checks whether the number of pieces of data accumulated by the learning data accumulation unit 124 (the number of pieces of environment information and work result information of the robot 20) exceeds a predetermined threshold for learning. The number of pieces of data is the number of data accumulated after the latest work model (work model stored in the model storage unit 111) is obtained.

If it is determined in operation S15 that the number of pieces of data does not exceed the predetermined threshold for learning, the edge controller 100 returns the process to operation S11. If it is determined in operation S15 that the number of data exceeds the predetermined threshold for learning, the edge controller 100 executes operations S16 and S17. In operation S16, the model update unit 125 updates the work model of the model storage unit 111 by machine learning based on the learning data accumulated by the learning data accumulation unit 124. In operation S17, the update content reflecting unit 126 reflects the update content of the work model of the robot 20 in operation S16 in the work model of any other robot 20. The edge controller 100 repeats the above procedure for each work model of the plurality of robots 20.

Receive Procedure of Support Information

The receive procedure of support information includes: selecting any of multiple operators in response to a request of support information from the edge controller 100; transmitting environment information of the robot 20 to the teaching terminal 40 of the selected operator via the communication network 50; receiving support information based on the environment information from the teaching terminal 40 of the selected operator via the communication network 50; and transmitting the received support information to the edge controller 100.

Figure 7:
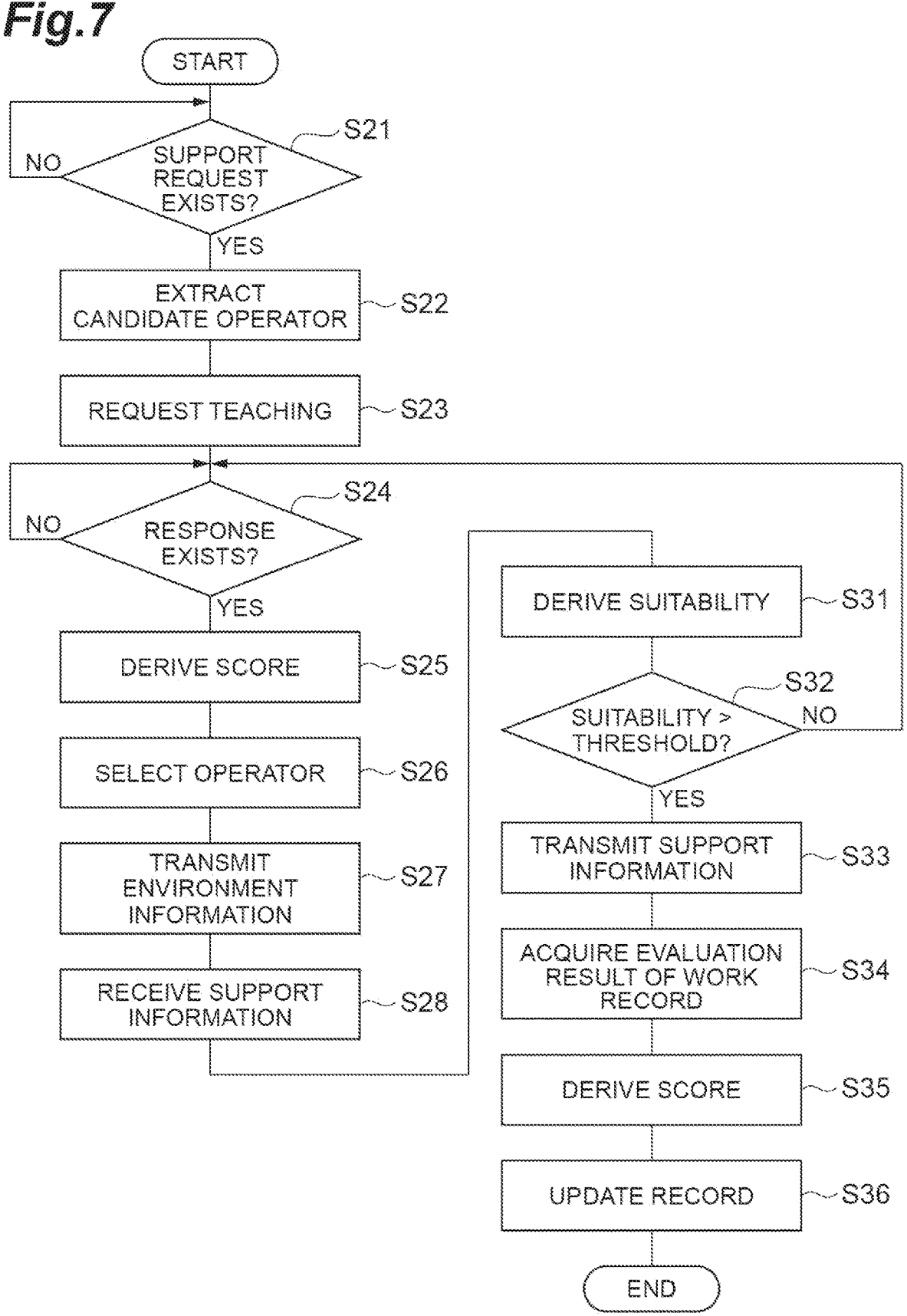
FIG. 7 is a flowchart illustrating a receive procedure of support information.

For example, as shown in FIG. 7, the collaboration controller 200 executes operations S21, S22, S23, and S24. In operation S21, the support request acquisition unit 212 acquires the transmit request of the support information from the support request unit 117. In operation S22, the teaching request unit 213 extracts an operator capable of teaching the work type of the robot 20 targeted by the support information from the multiple operators stored in the operator storage unit 211. Hereinafter, the operator extracted by the teaching request unit 213 is referred to as a "candidate operator". In operation S23, the teaching request unit 213 requests the candidate operator extracted in operation S22 to transmit support information via the communication network 50. In operation S24, the score derivation unit 233 waits for a response from the candidate operator. The score derivation unit 233 may wait for responses from multiple candidate operators.

Next, the collaboration controller 200 executes operations S25 and S26. In operation S25, the score derivation unit 233 derives the score of the candidate operator in response to the teaching request based on the post-suitability previously derived by the post-evaluation unit 232. For example, the score derivation unit 233 refers to the teaching record storage unit 241 and derives the score of the candidate operator based on the teaching record value. In operation S26, the selection unit 214 selects one of the candidate operators as a transmitter of support information. For example, the selection unit 214 may select one of the multiple operators based on the score derived by the score derivation unit 233.

Next, the collaboration controller 200 executes operations S27 and S28. The selection unit 214 may select any of the multiple operators based on a combination of the select criterion based on the score height and another select criterion (for example, the select criterion based on the work type and the select criterion based on the response speed). In operation S27, the environment information transmission unit 215 transmits the environment information of the robot 20 to the operator selected by the selected operator unit 214 via the communication network 50. In operation S28, the support information receiving unit 216 receives support information from the selected operator via the communication network 50.

Next, the collaboration controller 200 executes operations S31 and S32. In operation S31, the pre-evaluation unit 221 derives the pre-suitability of the support information based on the existing data. In operation S32, the support availability determination unit 222 determines the adoptability of the support information based on the pre-suitability derived by the pre-evaluation unit 221. For example, the support availability determination unit 222 determines whether the pre-suitability exceeds a predetermined adoption threshold.

If it is determined in operation S32 that support information cannot be adopted, the collaboration controller 200 returns the process to operation S24. Thereafter, the acquisition of the support information and the determination of the adoptability based on the pre-suitability are repeated until the support availability determination unit 222 determines that the support information is adoptable.

If it is determined in operation S32 that support information can be adopted, the collaboration controller 200 executes operations S33 and S34. In operation S33, the support information transmission unit 217 transmits the support information determined to be adoptable to the edge controller 100. In operation S34, the performance information receiving unit 231 receives work result information indicating the work result of the robot 20 based on the support information from the performance information transmission unit 127.

Next, the collaboration controller 200 executes operations S35 and S36. In operation S35, the post-evaluation unit 232 derives the post-suitability of the support information based on the work result information received by the performance information receiving unit 231. In operation S36, the teaching record update unit 242 adds the value correlated with the post-suitability of the support information to the teaching record value of the operator of the support information, and the usage record update unit 244 adds the value correlated with the post-suitability of the support information to the usage record value of the robot 20 that utilized the support information. This completes the receive procedure of the support information. The collaboration controller 200 repeats the above procedure.

As described above, the robot control system 1 includes: the operator storage unit 211 configured to store information of multiple operators; the selection unit 214 configured to select one of the multiple operators stored in the operator storage unit 211 in response to determining that support information is necessary for the robot 20 to continue work; the environment information transmission unit 215 configured to transmit environment information of the robot 20 to an operator selected by the selection unit 214 via the communication network 50; and the support information receiving unit 216 configured to receive the support information from the operator selected by the selection unit 214 via the communication network 50.

According to the robot control system 1, the provision of support information from multiple operators via the communication network 50 may be received. Therefore, even if there is no operator waiting at all times, the support information may be acquired at an early stage and continue the work of the robot 20. In addition, since each operator does not always wait near the robot 20, his own work may be performed. Efficient cooperation between the robot 20 and a person may be achieved.

The robot control system 1 may further include: the pre-evaluation unit 221 configured to derive a suitability of the support information based on existing data before a work of the robot 20 based on the support information; and the support availability determination unit 222 configured to determine an adoptability of the support information based on the suitability of the support information derived by the pre-evaluation unit. In this case, the reliability of the work of the robot 20 based on the support information may be improved by making it impossible to adopt the support information having a low degree of suitability while receiving a wide range of support information from the multiple operators.

The robot control system 1 may further include: the post-evaluation unit 232 configured to derive a suitability of the support information based on a work result of the robot 20 after the work of the robot 20 based on the support information; and the score derivation unit 233 configured to derive, based on the suitability of the support information derived by the post-evaluation unit 232, a score of the operator who provides the support information, and the selection unit 214 may be further configured to select one of the multiple operators based on the score derived by the score derivation unit 233. In this case, the reliability of the work of the robot 20 based on the support information may be improved by giving priority to the operator who tends to provide the support information with a high degree of suitability while receiving the support information widely from the multiple operators.

The information of the multiple operators stored in the operator storage unit 211 may include information of a work type that can be taught by each of the multiple operators, and the selection unit 214 may be further configured to select one of the multiple operators based on the information of a work type that can be taught by each of the multiple operators and a work type of the work of the robot 20. In this case, the reliability of the work of the robot 20 based on the support information may be further improved by giving priority to the operator suitable for the work type targeted by the support information while widely receiving the support information from the multiple operators.

The robot control system 1 may further include the teaching request unit 213 configured to request, in response to determining that the support information is necessary, the multiple operators stored in the operator storage unit 211 to transmit the support information via the communication network 50, and the selection unit 214 may be further configured to select one of the multiple operators based on a response speed to a request from the teaching request unit 213. In this case, by giving priority to an operator who responds quickly, the operator can be prompted to provide support information more quickly. Therefore, the work efficiency of the robot 20 can be further improved.

The robot control system 1 may further include: the teaching record storage unit 241 configured to store a teaching record value and an operator in association with each other, the teaching record value being a calculation reference of a reward amount for the support information; and a teaching record update unit 242 configured to update the teaching record value of the operator of the support information according to the work every time the work of the robot 20 based on the support information is executed. In this case, the operator can be prompted to provide more aggressive support information by correlating the teaching record with the reward amount. Therefore, the work efficiency of the robot 20 can be further improved.

The robot control system 1 may further include: the usage record storage unit 243 configured to store a usage record value and the robot 20 in association with each other, the usage record value serving as a calculation reference of a billing amount corresponding to utilization of the support information; and the usage record update unit 244 configured to update the usage record value of the robot 20 according to the work every time the work of the robot 20 based on the support information is executed. In this case, the effective use of the support information may be promoted by reasonable billing according to the utilization result.

The robot control system 1 may further include: the model storage unit 111 configured to store a work model configured to output work instruction information of the robot 20 corresponding to environment information of the robot 20 in response to input of the environment information of the robot 20; the work instruction derivation unit 113 configured to derive work instruction information for the robot 20 based on the environment information of the robot 20 and the work model stored in the model storage unit 111; the work availability determination unit 116 configured to determine work availability of the work of the robot 20 based on the work instruction information, based on environment information of the robot 20 and the work model stored in the model storage unit 111; and the support request unit 117 configured to request the support information in response to determining that the work availability determination unit 116 determines that the work of the robot 20 based on the work instruction information is unavailable. In this case, the autonomous operation of the robot 20 is utilized to reduce the situation where the support information becomes necessary, thereby further reducing the burden on the operator.

The robot control system 1 may include: the learning data accumulation unit 124 configured to accumulate environment information of the robot 20 and a work result of the robot 20 as learning data; and the model update unit 125 configured to update the work model by machine learning based on the learning data accumulated by the learning data accumulation unit 124. In this case, the burden on the operator may be gradually reduced by improving the autonomy of the robot 20 through machine learning.

The robot control system 1 may further include: the learning data accumulation unit 124 configured to accumulate environment information of the robot 20 and a work result of the robot 20 as learning data; and the model update unit 125 configured to update the work model by machine learning based on the learning data accumulated by the learning data accumulation unit 124. In this case, the autonomy of each robot 20 can be quickly improved by sharing the latest work model.

Although certain procedures or operations are described herein as being performed sequentially or in a particular order, in some examples one or more of the operations may be performed in a different order, in parallel, simultaneously with each other, or in an overlapping manner. Additionally, in some examples, one or more of the operations may be optionally performed or, in some cases, omitted altogether.

We claim all modifications and variations coming within the spirit and scope of the subject matter claimed herein.

What is claimed is:

1. A robot control system comprising circuitry configured to:
   generate an internal work instruction for completing an automated work based on an environment information and a work model, the work model being configured to output internal data indicating the internal work instruction, including a designation of a first recommendation degree for a first object of the automated work and a second recommendation degree for a second object of the automated work, in response to input of the environment information;
   evaluate a reliability of the internal work instruction based on a difference between the first recommendation degree and the second recommendation degree, wherein the reliability of the internal work instruction is increased as the difference between the first recommendation degree and the second recommendation degree increases;
   determine a necessity of assisting a robot to complete the automated work, based on the reliability of the internal work instruction;
   transmit the environment information to a remote operator via a communication network, in response to determining the necessity of assisting the robot to complete the automated work;
   receive an operation instruction based on the environment information from the remote operator via the communication network; and
   control the robot to complete the automated work based on the operation instruction.

2. The robot control system according to claim 1, wherein the circuitry is further configured to:
   control the robot to complete the automated work based on the internal work instruction in response to determining that the reliability of the internal work instruction is higher than a reliability threshold; and
   determine that it is necessary to assist the robot if the reliability of the internal work instruction is lower than the reliability threshold.

3. The robot control system according to claim 1, wherein the circuitry is further configured to:
   control the robot to complete the automated work based on the internal work instruction in response to determining that it is not necessary to assist the robot to complete the automated work;
   accumulate first data including the environment information, the internal work instruction, and a first result of the automated work indicating a suitability of the internal work instruction;
   select, before transmitting the environment information to the remote operator, the remote operator from candidate remote operators based on stored operator data in response to determining that it is necessary to assist the robot to complete the automated work;
   accumulate, after controlling the robot based on the operation instruction, second data including the environment information, the operation instruction, and a second result of the automated work indicating a suitability of the operation instruction; and
   update the work model by machine learning based on both the accumulated first data and the accumulated second data.

4. The robot control system according to claim 3, wherein the circuitry is further configured to:
   extract learning data from both the accumulated first data and the accumulated second data based on the first result and the second result for updating the work model to increase the suitability of the internal work instruction; and
   update the work model by the machine learning based on the extracted learning data.

5. The robot control system according to claim 1, wherein the circuitry is further configured to:
   control the robot to complete the automated work based on the internal work instruction in response to determining that it is not necessary to assist the robot to complete the automated work;
   accumulate first data including the environment information, the internal work instruction, and a first result of the automated work indicating a suitability of the internal work instruction;
   transmit the environment information to candidate remote operators including the remote operator via a communication network in response to determining that it is necessary to assist the robot to complete the automated work;
   receive operation instructions based on the environment information from the candidate remote operators via the communication network;
   evaluate a pre-suitability of each of the operation instructions;
   select the operation instruction having a highest pre-suitability from among the operation instructions;
   accumulate, after controlling the robot based on the operation instruction, second data including the environment information, the operation instruction, and a second result of the automated work indicating a suitability of the operation instruction; and
   update the work model by machine learning based on both the accumulated first data and the accumulated second data.

6. A robot control method, comprising:
   generating an internal work instruction for completing an automated work based on an environment information and a work model, the work model being configured to output internal data indicating the internal work instruction, including a designation of a first recommendation degree for a first object of the automated work and a second recommendation degree for a second object of the automated work, in response to input of the environment information;

evaluating a reliability of the internal work instruction based on a difference between the first recommendation degree and the second recommendation degree, wherein the reliability of the internal work instruction is decreased as the difference between the first recommendation degree and the second recommendation degree decreases;

determining a necessity of assisting a robot to complete the automated work, based on the reliability of the internal work instruction;

transmitting the environment information to a remote operator via a communication network, in response to determining the necessity of assisting the robot to complete the automated work;

receiving an operation instruction based on the environment information from the remote operator via the communication network; and controlling the robot to complete the automated work based on the operation instruction.

7. The robot control method according to claim 6, further comprising:

controlling the robot to complete the automated work based on the internal work instruction in response to determining that it is not necessary to assist the robot to complete the automated work;

accumulating first data including the environment information, the internal work instruction, and a first result of the automated work indicating a suitability of the internal work instruction;

selecting, before transmitting the environment information to the remote operator, the remote operator from candidate remote operators based on stored operator data in response to determining that it is necessary to assist the robot to complete the automated work;

accumulating, after controlling the robot based on the operation instruction, second data including the environment information, the operation instruction, and a second result of the automated work indicating a suitability of the operation instruction; and updating the work model by machine learning based on both the accumulated first data and the accumulated second data.

8. The robot control method according to claim 6, further comprising:

controlling the robot to complete the automated work based on the internal work instruction in response to determining that it is not necessary to assist the robot to complete the automated work;

accumulating first data including the environment information, the internal work instruction, and a first result of the automated work indicating a suitability of the internal work instruction;

transmitting the environment information to candidate remote operators including the remote operator via a communication network in response to determining that it is necessary to assist the robot to complete the automated work;

receiving operation instructions based on the environment information from the candidate remote operators via the communication network;

evaluating a pre-suitability of each of the operation instructions;

selecting the operation instruction having a highest pre-suitability from among the operation instructions;

accumulating, after controlling the robot based on the operation instruction, second data including the environment information, the operation instruction, and a second result of the automated work indicating a suitability of the operation instruction; and updating the work model by machine learning based on both the accumulated first data and the accumulated second data.

9. The robot control method according to claim 8, further comprising:

extracting learning data from both the accumulated first data and the accumulated second data based on the first result and the second result for updating the work model to increase the suitability of the internal work instruction; and updating the work model by the machine learning based on the extracted learning data.

10. A robot control system comprising circuitry configured to:

determine a necessity of assisting a robot to complete automated work, based on environment information of the robot;

transmit the environment information to a remote operator via a communication network in response to determining that it is necessary to assist the robot to complete the automated work, receive an operation instruction based on the environment information from the remote operator via the communication network;

control the robot to complete the automated work based on the operation instruction;

evaluate a post-suitability of the operation instruction based on a work result of the automated work based on the operation instruction;

store a usage record value of the robot;

update the usage record value of the robot by adding the post-suitability value of the operation instruction to the usage record value; and assign a billing amount to the operation instruction based on the usage record value.

11. The robot control system according to claim 10, wherein the circuitry is further configured to:

generate an internal work instruction for completing the automated work based on the environment information and a work model, the work model being configured to output internal data indicating the internal work instruction, evaluate a reliability of the internal work instruction based on the internal data;

determine the necessity of assisting the robot based on the reliability of the internal work instruction;

control the robot to complete the automated work based on the internal work instruction in response to determining that it is not necessary to assist the robot to complete the automated work;

accumulate first data including the environment information, the internal work instruction, and a first result of the automated work indicating a suitability of the internal work instruction;

select, before transmitting the environment information to the remote operator, the remote operator from candidate remote operators based on stored operator data in response to determining that it is necessary to assist the robot to complete the automated work;

accumulate, after controlling the robot based on the operation instruction, second data including the environment information, the operation instruction, and a second result of the automated work indicating a suitability of the operation instruction; and update the work model by machine learning based on both the accumulated first data and the accumulated second data.

12. The robot control system according to claim 11, wherein the circuitry is further configured to:
    evaluate a pre-suitability of the operation instruction before controlling the robot based on the operation instruction; and
    reject the operation instruction if the pre-suitability is lower than a suitability threshold.

13. The robot control system according to claim 12, wherein the circuitry is further configured to:
    select another remote operator from the candidate remote operators based on the operator data if the pre-suitability is lower than the suitability threshold;
    transmit the environment information to the selected other remote operator;
    receive another operation instruction based on the environment information from the selected other remote operator via the communication network; and
    control the robot to complete the automated work based on the other operation instruction.

14. The robot control system according to claim 12, wherein the circuitry is further configured to:
    repeat, if the pre-suitability is lower than the suitability threshold, an additional selection process until determining that the pre-suitability is equal to or higher than the suitability threshold, the additional selection process including:
        selecting another remote operator from the candidate remote operators based on the operator data;
        transmitting the environment information to the selected other remote operator;
        receiving another operation instruction based on the environment information from the selected other remote operator via the communication network; and
        evaluating a pre-suitability of the other operation instruction; and
    control the robot to complete the automated work based on the other operation instruction after repeating the additional selection process.

15. The robot control system according to claim 12, wherein the operation instruction includes a designation of a work object of the automated work, and
    wherein the circuitry is further configured to evaluate the pre-suitability based on a suitability as a work target of the work object for a type of the automated work.

16. The robot control system according to claim 11, wherein the operator data includes a score for each of the candidate remote operators, and
    wherein the circuitry is further configured to:
        select the remote operator from the candidate remote operators based at least in part on the score for each of the candidate remote operators;
        evaluate a post-suitability of the operation instruction based on a work result of the automated work based on the operation instruction; and
        update the score of the selected remote operator based on the post-suitability for future selection.

17. The robot control system according to claim 11, wherein the operator data includes a teaching type of each of the candidate remote operators, and
    wherein the circuitry is further configured to select the remote operator based on a comparison between a work type of the automated work and a teaching type of each of the candidate remote operators.

18. The robot control system according to claim 11, wherein the circuitry is further configured to:
    transmit, before selecting the remote operator, an instruction request to the candidate remote operators via the communication network; and
    select the remote operator from two or more remote operators who replied to the instruction request via the communication network.

19. The robot control system according to claim 18, wherein the circuitry is further configured to:
    select the remote operator from the two or more remote operators further based on a response speed to the instruction request.

20. The robot control system according to claim 11, wherein the operator data includes a teaching type of each of multiple remote operators, and
    wherein the circuitry is further configured to extract the candidate remote operators from the multiple remote operators based on a comparison between a type of the automated work and the teaching type of each of the multiple remote operators before selecting the remote operator from the candidate remote operators.

* * * * *